(12) United States Patent
Poppell

(10) Patent No.: US 6,168,051 B1
(45) Date of Patent: Jan. 2, 2001

(54) HOT FLUID TRANSFER MECHANISM

(76) Inventor: Timothy L. Poppell, 402 Dogwood Way, Panama City, FL (US) 32404

(*) Notice: Under 35 U.S.C. 154(b), the term of this patent shall be extended for 0 days.

(21) Appl. No.: 09/512,023

(22) Filed: Feb. 24, 2000

(51) Int. Cl.[7] ................................................ B65D 37/00
(52) U.S. Cl. .............................................. 222/209; 222/69
(58) Field of Search .................... 222/69, 209, 400.8, 222/401, 400.5, 109

(56) References Cited

U.S. PATENT DOCUMENTS

| 4,044,912 | 8/1977 | Nichols . |
|---|---|---|
| 4,555,339 | 11/1985 | Graves et al. . |
| 4,930,906 | 6/1990 | Hemphill . |
| 5,322,196 | 6/1994 | Burton . |

*Primary Examiner*—Philippe Derakshani
*Assistant Examiner*—Thach H. Bui
(74) *Attorney, Agent, or Firm*—William B. Noll

(57) ABSTRACT

A portable receptacle for extracting and transmitting a hot fluid substance, such as grease and basting juices, in a safe manner. The receptacle includes a housing base for receiving a throw away, collapsible foil basket, and a cover housing pivotally mounted thereto. Incorporated into the cover housing is a bellows member, operable by a hand activated member within a handle, to effect the extracting or transmitting through an elongated, extendable spout in communication with the foil basket.

8 Claims, 6 Drawing Sheets

HOT FLUID TRANSFER MECHANISM

FIELD OF THE INVENTION

This invention is directed to the field of safe, portable, liquid transfer systems, such as may be used in a kitchen to extract hot grease or basting fluids for cooking purposes.

BACKGROUND OF THE INVENTION

The present invention relates to a portable and convenient mechanism to be used in one's kitchen to safely transfer hot viscous fluids, such as for extracting basting juices, then dispensing the juices onto the meat or fowl. One common device that may be found in a kitchen is a syringe type device that can be used to extract basting juices for subsequent dispensing onto the food product. With such a device, the hot basting juices necessarily come into contact with the syringe bladder, which over time, can cause deterioration and eventual failure of the bladder material. Additionally, the interior of the bladder is difficult to clean and sanitize for later uses.

When one desires to cook a quantity of bacon, it is well known that considerable grease will be generated in the process. If the grease can be periodically extracted, there is better control on the cooking process. Typically, one has to try and drain the grease from the skillet, preferably by spooning excess grease into a receptable. This can be dangerous, or at the least a messy procedure.

The prior art, as reflected in the following U.S. patents, recognize the need for a safe transfer system, but fall short in providing the convenience and portability of the present invention. The prior art is as follows:

a.) U.S. Pat. No. 5,322,196, to Burton, teaches a device to provide an upgraded container for reuseable cooking grease. The product comprises components constructed of heat resistance material to effectively store, refrigerate and reheat cooking oil without deforming shape or dimension. There is a flip latch used to scoop grease drippings back into the container and to cover the pouring holes. Beneath the holes is a drip catcher used to catch dripping grease after pouring. An indicator shows the level of contents at all times. At the top rim of the container is a strainer secured in place to prevent anything other than grease from flowing back in the container.

b.) U.S. Pat. No. 4,930,906, to Hemphill, is directed to a cooking grease disposal bag formed with a multiply construction and has an internal layer of a heavy gage deformable aluminum foil, an intermediate layer formed by a puncture resistant polyethylene sheet, and an outer layer formed by an insulating paper material. First and second fold lines are designated by indicia on an external front wall of the bag. A permanent adhesive strip covered by a peel off layer is disposed across a top edge of the front wall and a pair of tacky adhesive strips each having exposed tacky adhesive surfaces have a first end secured adjacent a first fold line and a second free end. The tacky adhesive strips may be utilized to temporarily seal the bag, while the permanent adhesive strip may be utilized to permanently seal the bag for disposal.

c.) U.S. Pat. No. 4,555,339, to Graves, et al., relates to a cooking grease collection pot which includes inner and outer cylindrical containers. The inner container is made of a heat resistant plastic material and it includes an overlapping portion on which the lid is screwed so that the outer periphery of the lid can be grasped by hand in order to lift and remove the inner container. The inner container includes a screw-on lid and it is provided with a notch in its base for receiving a wedge that projects upwardly from the base of the outer container. The engagement between the notch and wedge prevents relative rotation of the containers to permit the lid for the inner container to be screwed on and off. The inner container may be removed for disposal and includes a strainer.

d.) U.S. Pat. No. 4,044,912, to Nichols, teaches a container consisting of a rigid outer tank having a collapsible bag liner for retaining viscous substances, such as grease. A vane shape spacer assembly is disposed inside the bar and secured to the open upper end of the bag to provide a skeletal structure about which the bag can collapse as the grease is being removed to thereby insure more complete evacuation of a filled tank than has heretofore been possible .

While the above prior art offer some solutions for the handling of hot viscous liquid, such as grease, none appear to provide a convenient and portable kitchen appliance to handle hot grease and other hot fluids that are a part of modern day cooking. The manner by which the present invention provides the convenience and portability that is so necessary to cooking will become more apparent from the following specification, particularly when read in conjunction with the accompanying drawings.

SUMMARY OF THE INVENTION

This invention is directed to a kitchen appliance for conveniently and safely transferring hot fluids, such as basting juices or viscous grease, from one location to another. The appliance, or fluid transfer mechanism, comprises a base having a central recess for removably receiving a collapsible foil bag for the easy and safe removal of unwanted fluid substances, such as grease. The base mounts a pivotal cover housing having a depressible handle mechanism and an extendible transfer spout which, when the housing is closed or pivoted position, is in fluid communication with the properly positioned foil bag. Mounted internally within the cover housing are a first member sized to overlie in fluid sealing engagement with the foil bag, and an encircling compression spring member about a depressible bladder or bellows member. The depressible handle mechanism includes a pivotal hand gripping member, a biasing spring to return the gripping member to an extended position, and a vertically slidable L-shaped member to effect compression of the bellows member. The first member, overriding the foil bag, includes a central opening in communication with the bellows member. However, to avoid excess fluid entering the bellows member through the central opening, a pivotal, floating valve is provided on the underside of the first member with a pivoting arm extending downward into the foil bag. As the fluid rises to a maximum level, the valve includes a movable pivot arm having a stop that closes the central opening. In operation, to transfer fluid from the foil bag, the hand gripping member is squeezed or depressed causing the compression spring and bellows member to depress forcing air within the bellows member to exit through the central opening. The evacuated air forces the fluid through the spout or nozzle to the location desired. To extract grease from a skillet, for example, the opposite procedure is followed. That is, the hand gripping member is fully depressed and, with the nozzle or spout fully extended, the spout opening is placed into the grease. As the hand gripping member is slowly released, the bellows member expands towards it normal or resiled condition to thereby draw the grease into the spout or nozzle and thence into the foil bag. If one desires to dispose of the grease, the cover is opened and the collapsible bag removed and folded upon itself for a safe disposal.

Accordingly, an object of this invention is to provide a convenient kitchen appliance for safely transferring hot fluids, such as grease and basting juices, from one location to another.

Another object hereof is the provision of a removable and collapsible foil bag for conveniently disposing of unwanted fluid substances.

A further object of the invention is the provision of the use of an evacuatable bladder member that provides the operating pressure to effect transfer of the fluid.

These and other objects will become more apparent to those skilled in the art from the following description.

DETAILED DESCRIPTION OF PREFERRED EMBODIMENT

Figure 1:
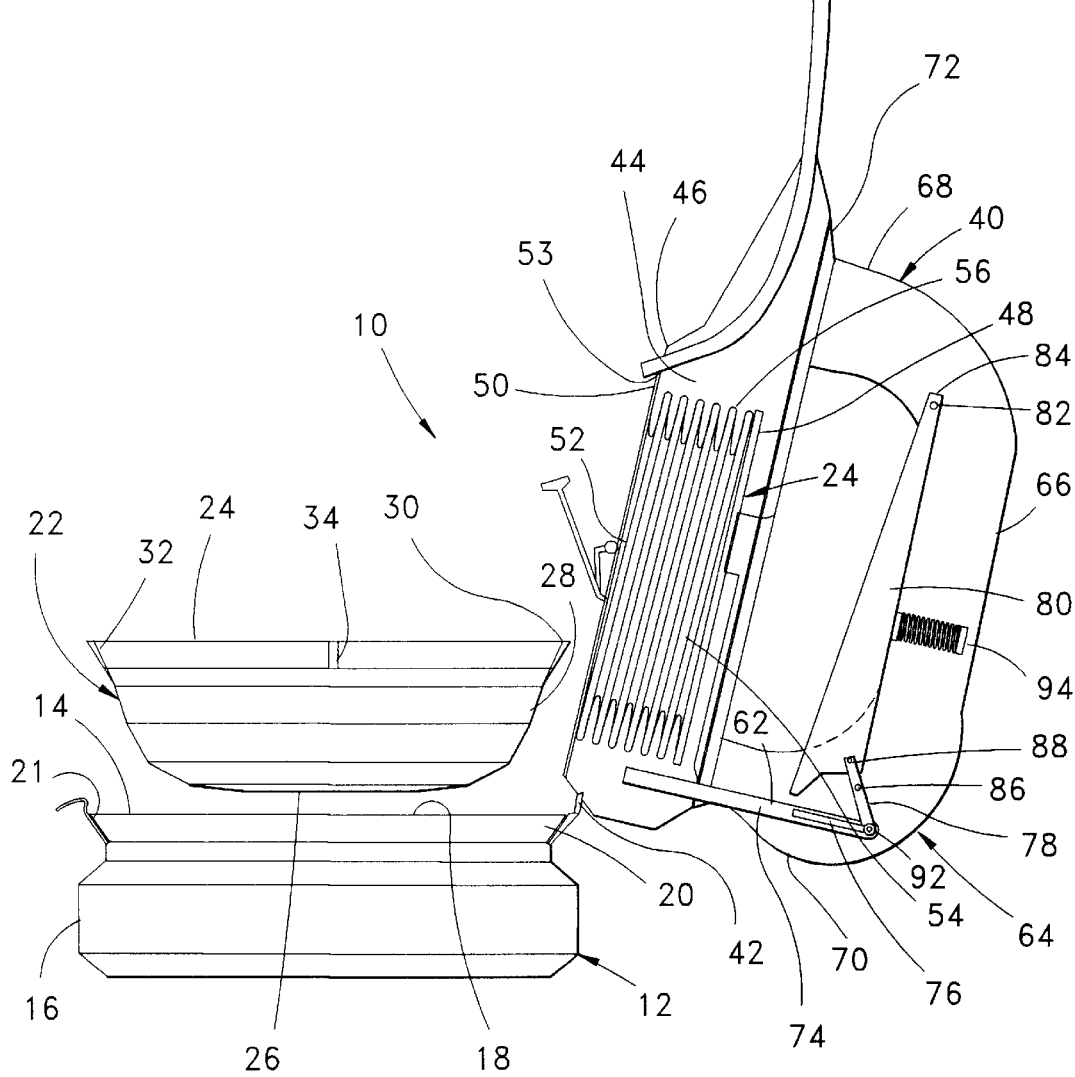
FIG. 1 is an exploded side view, with parts removed to reveal certain internal details, showing the permanent and disposable/replaceable components forming the opened portable receptacle for extracting and transmitting hot fluid substances according to this invention.

This invention relates to a hot fluid transfer mechanism, more particularly to a portable receptacle for extracting and transmitting hot fluid substances from one location to another. The portable receptacle has particular utility as a kitchen appliance for handling viscous grease and basting juices, while providing a safe and convenient means for the easy disposal of unwanted such fluids, The invention will now be described with regard to the several Figures, where like reference numerals represent like components or features throughout the various views.

Figure 2:
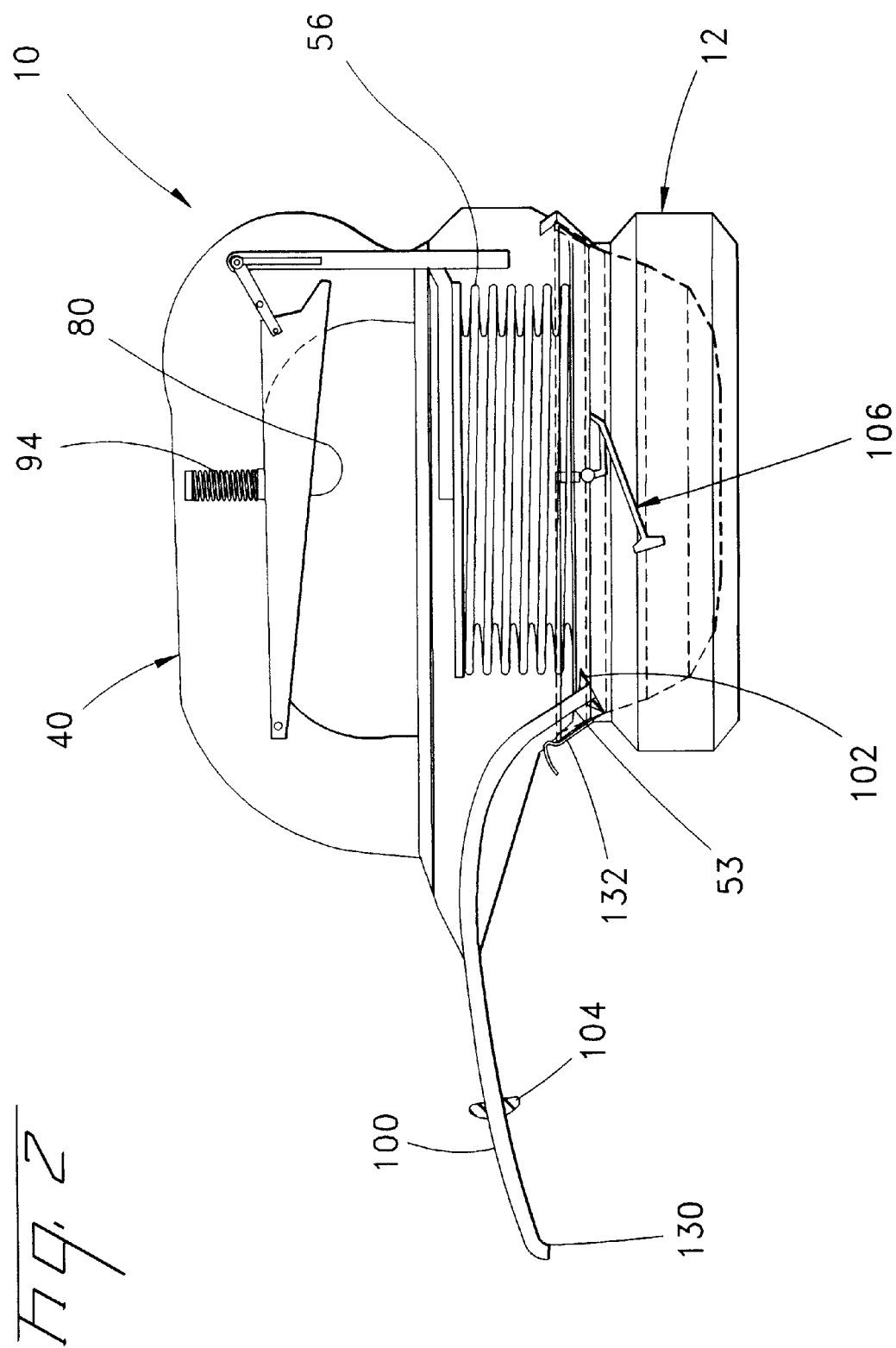
FIG. 2 is a side view showing the portable receptacle of FIG. 1 in a closed and relaxed operating position, prepatory for extracting a fluid from an outside source.

Turning now to FIGS. 1 and 2, showing the full receptacle 10 of this invention, with certain internal parts illustrated for ease of understanding, the receptacle 10 comprises a housing base 12 featuring a circular central recess 14 defined by an annular wall 16. The peripheral edge 18 of wall 16 preferably includes an outwardly angled flange portion 20 which, as will be noted later, may include an elastomeric ring 21 to receive and nest a metallic foil bag 22 shown poised for entry into the recess 14 in FIG. 1.

The metallic foil bag 22, intended as a disposable and replaceable component of the invention, comprises a circular basket 24, preferably formed of a metallic foil, such as aluminum, featuring a base 26 with an upstanding annular wall 28 terminating at an annular peripheral edge 30. The peripheral edge 30 may include a continuous elastomeric rim 32, the function of which will become more apparent hereafter. Since a purpose of the foil bag is to collect hot cooking fluids, for example, and to dispose of same in a safe and convenient manner, the elastomeric rim 32 may be provided with a pair of opposing score lines or reduced wall sections 34, see FIG. 1, to facilitate folding and collapsing of the bag upon itself. In such condition, the foil bag may be disposed of in a suitable receptacle.

Secured to the housing base 12 is a pivotally mounted cover housing 40, pivotal about hinge 42, by means known in the art. The cover housing 40 features a central cavity 44, opening to a circular annular edge 46, and is generally sized to coincide with the angled flange portion 20 of the housing base 12. Mounted within the cavity 44 is a bellows mechanism 47 comprising upper and lower plate members 48, 50, respectively, where the lower plate member 50 includes a central opening 52, a peripheral opening 53, the function of which will become apparent hereafter, a bladder or bellows member 54 positioned between the respective plate members 48, 50, and a surrounding compression spring 56, where the function thereof will be discussed later. Secured to the upper surface 58 of upper plate member 48 is an L-shaped member 60, where a first arm 62 extends vertically into the U-configured handle 64, as later described.

For convenience in handling the receptacle 10, the U-configured handle 64 is provided. The handle preferably includes a hand gripping portion 66 extending between a pair of legs 68, 70 secured to the cover housing upper surface 72 by means known in the art. The rear leg 70 includes a fixed channel or rectangular, tubular member 74 for slidably receiving first arm 62. The rectangular member 74 is provided with an elongated slot 76 for slidably receiving a pivot arm 78 connected to a pivotal hand gripping member 80 extending in part below the handle gripping portion 66. The hand gripping member 80 is pivotally mounted therein by pivot 82 at a forward end 84, and at the rear by pivot arm 78. The pivot arm 78, pivotally fixed about pivot arm 86, includes a first end 88 pivotally secured to the gripping member 80, and a second end 90 having a stop 92 for sliding movement within the slot 76. Finally, the handle gripping portion 66 may include an extended light spring 94 to bias the hand gripping member 80 to return to a resiled position when released by the user's hand.

Figure 5:
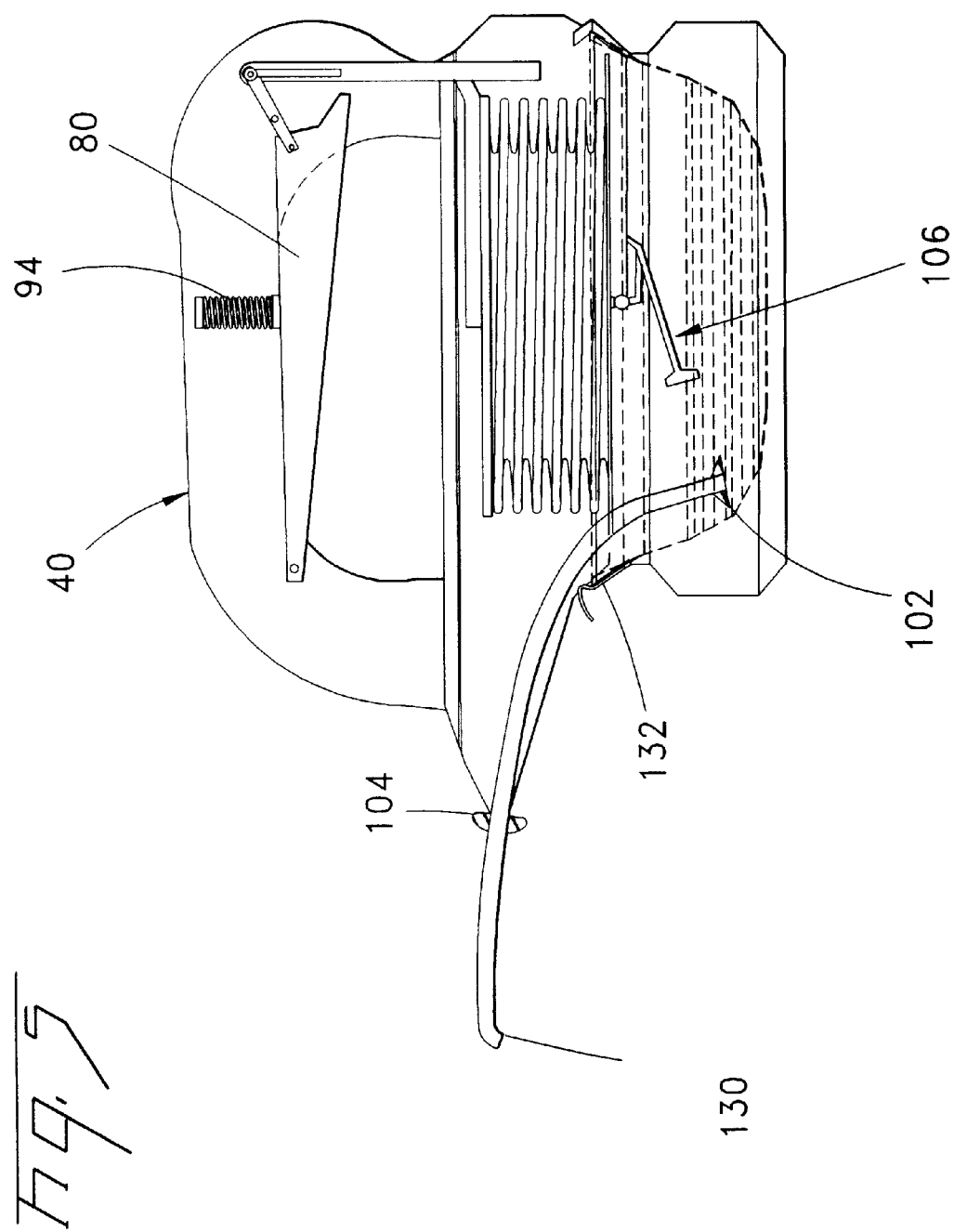
FIG. 5 is a side view similar to FIGS. 2–4 illustrating the portable receptacle hereof in a further operating position, with the extendable nozzle pushed into the receptacle to a second position, prepatory for basting or transferring a fluid therefrom.

FIG. 2 illustrates the normal inactive mode as a user may prepare for extracting fluid, such as basting juices, from a remote source. Since extracting fluids is the opposite of transferring fluids to a remote location, such as reapplying the basting juices, the snout or nozzle tubing 100 is positioned in a retracted or extended position, slidable through peripheral opening 53. FIG. 2 shows the snout 100 in an extended position for extracting fluids. To ensure that the snout can shift between the respective positions, first and second flared stops 102, 104 are provided, see FIGS. 2 and 5. FIG. 5, by way of example, illustrates the snout 100 in its retracted position for expelling fluid from the portable receptacle 10.

Figure 3:
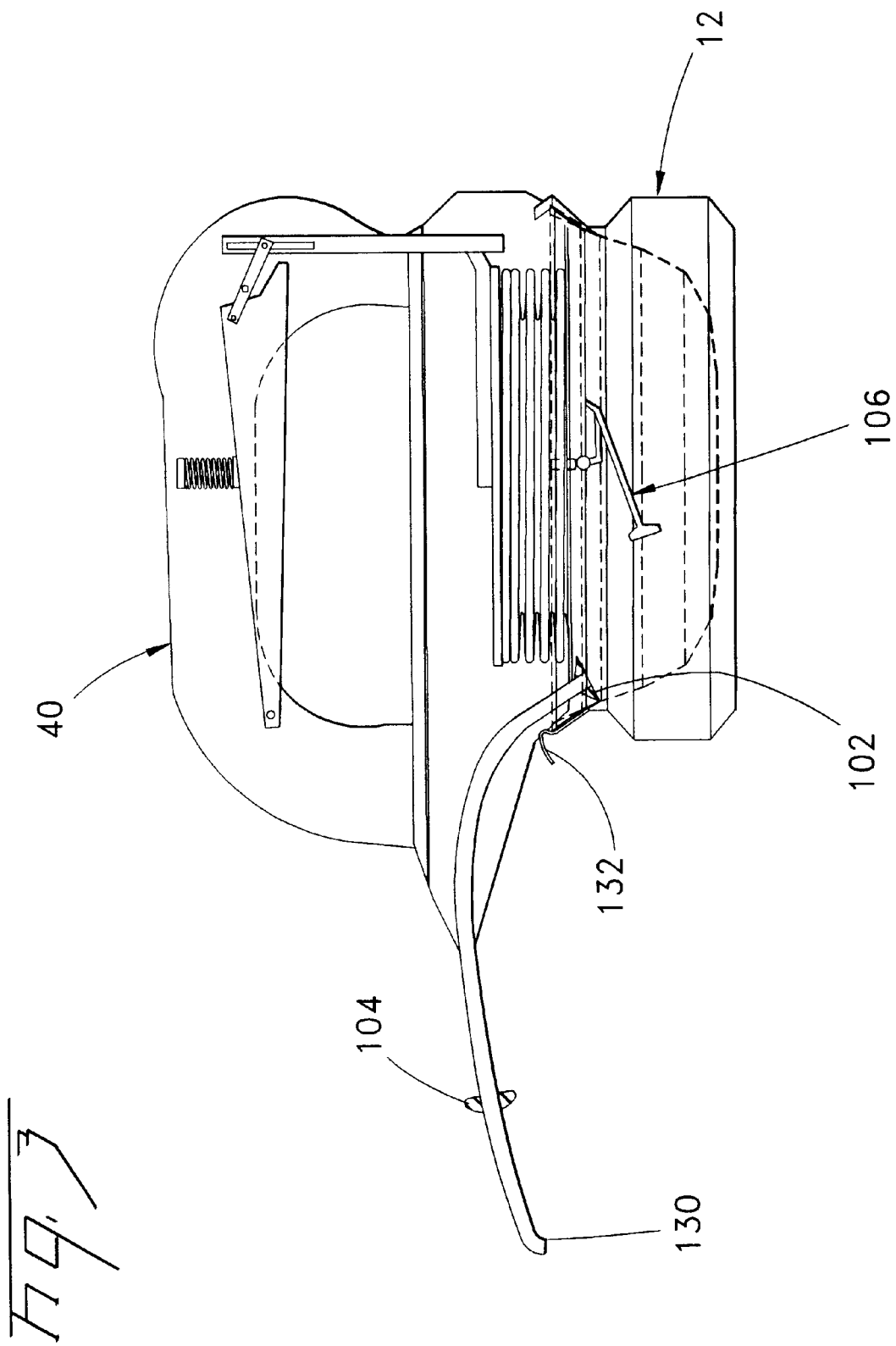
FIG. 3 is a side view similar to FIG. 2, showing the handle and bellows depressed for initiating the fluid extraction step.
Figure 4:
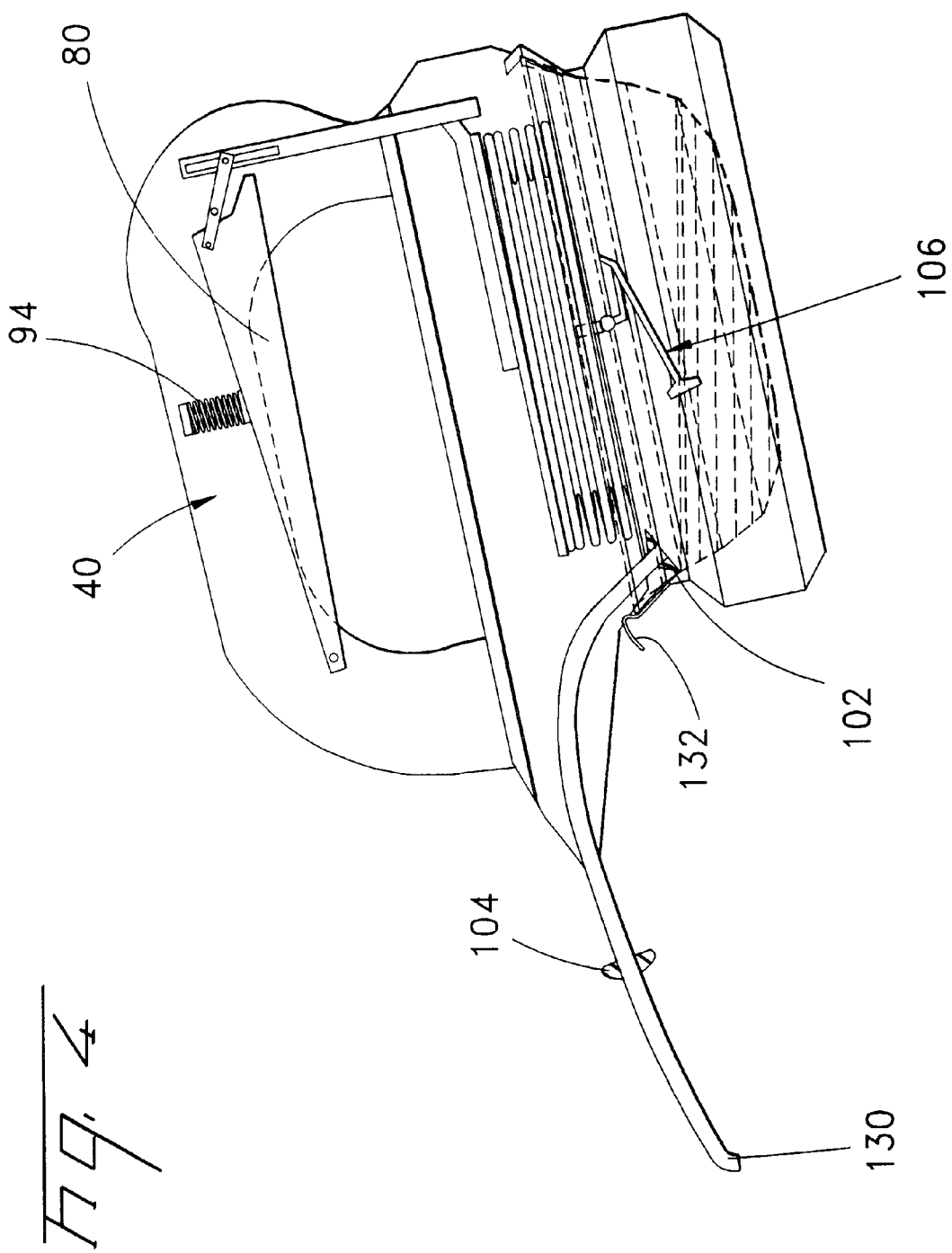
FIG. 4 is a side view similar to FIGS. 2 and 3, where the portable receptacle of this invention has been tilted to extract the fluid, where the fluid level is maximized with the pivotal, floating valve mechanism closing access to the bellows.
Figure 6:
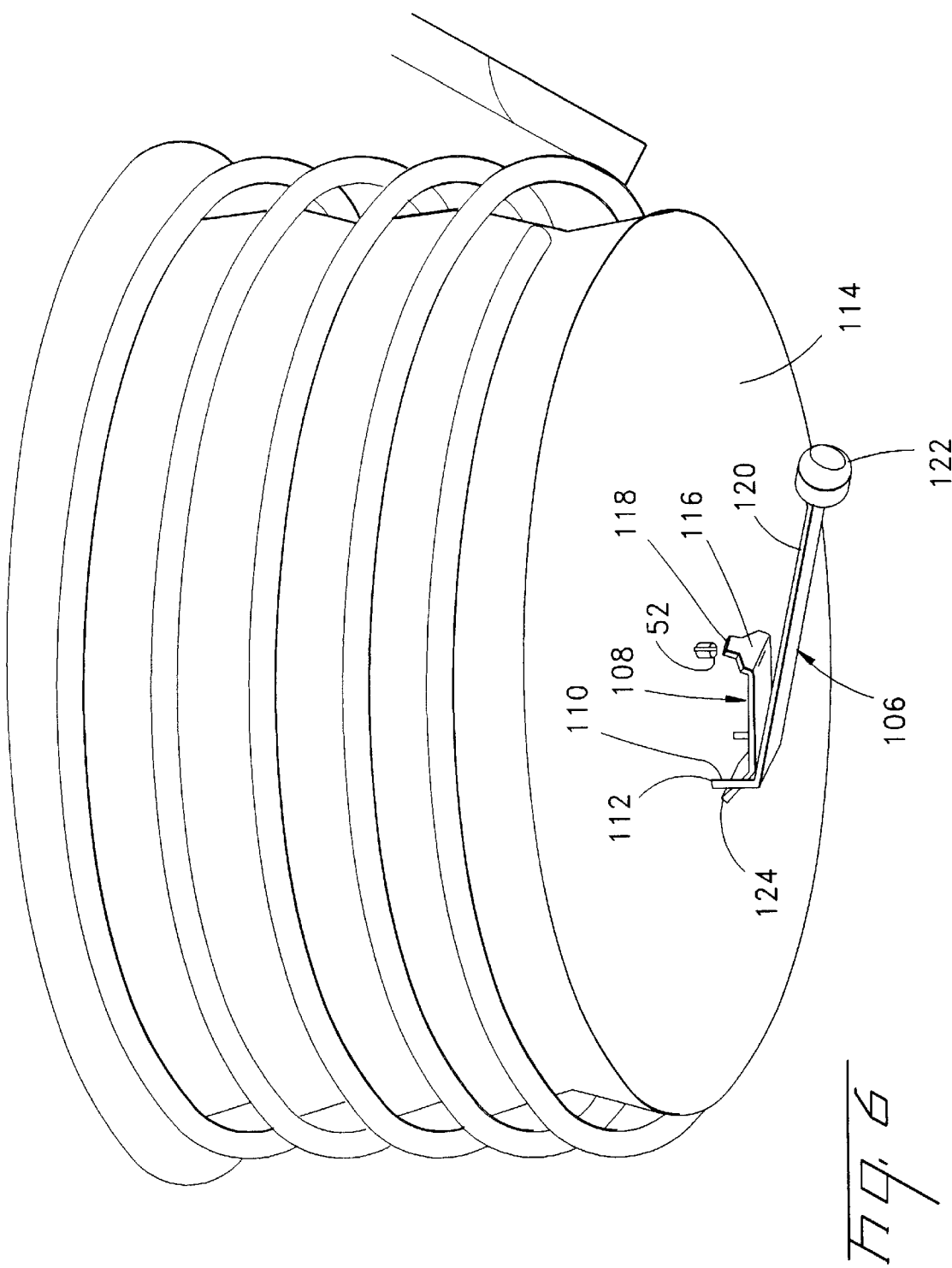
FIG. 6 is a partial, enlarged perspective view showing the pivotal, floating valve mechanism operable to close the bellows.

Returning to the extracting mode of FIGS. 2–4, it will be appreciated that it is important to avoid having hot fluids overfilling the metallic foil bag 22 and entering the bellows member through the central opening 52. In this regard, a pivotal, floating valve mechanism 106 is provided—see FIG. 6. The floating valve mechanism 106 comprises a V-shaped member 108, hinged for pivotal movement about U-shaped arm 110 fixed at its free ends 112 to the underside 114 of the lower plate member 50. A first arm 116 of the V-shaped member includes a head 118 positioned to contact and close central opening 52. The second arm 120, extending downwardly into the foil bag 22, includes a floating head 122 of sufficiently light weight to be bouyed by the rising fluid in the foil bag 22, Thus, as the floating head 122 rises with the incoming fluid, the head 118 is pivoted upwardly to eventually close the central opening 52 and thus prevent fluid from entering the bellows member 54, note FIG. 4. Finally, a pivot stop 124, as an extension of second arm 120, may be provided to limit the downward most position of the second arm 120.

The collection of fluids, whether it be basting fluids, grease or the like, may be illustrated in FIGS. 2–4. FIG. 2, with the snout 100 pulled to its extended position, shows the portable receptacle 10 hereof in the resiled condition. Initially, as seen in FIG. 3, the hand gripping member 80 is squeezed which causes the upper and lower plate members 48, 50 to move toward one another, compress the spring 56, and expel air from the bellows member 54 out through the snout 100. With such air expelled, the snout end 130 is placed into the fluid source. Thereafter, the hand gripping member 80 is released, and through the assistance of spring 94 and expanding spring 56, the expanding bellows member begins to pull or suck fluid into the portable receptacle and associated foil bag. As the fluid begins to rise therein, the floating head 122 also begins to rise pivoting the head 118 to close off the central opening 52, see FIG. 4.

To redistribute or dispense such fluid, the snout 100 is pushed deeper into the receptacle 10, as seen in FIG. 5. With the system so arranged, the hand gripping member 80 is squeezed with the air from the bellows member pushing against the fluid, which in turn exits the snout 100.

Finally, to facilitate transporting a hot fluid substance, and to allow easy access for removing the foil bag 22, a releasable latch 132 is provided to temporarily secure the cover housing to the base housing.

It is recognized that persons skilled in the art may readily determine that modifications, changes and variations may be made to the portable receptacle of this invention from a reading of the foregoing specification. Accordingly, no limitation is intended to be imposed on this invention except as set forth in the following claims.

What is claimed is:

1. A portable receptacle for extracting and transmitting a hot fluid substance in a safe manner, said receptacle comprising:

a.) a circular housing base having a central recess for removably receiving a foil bag, where the foil bag is collapsible and fabricated of a metal foil, and features a base and an upstanding annular wall terminating in a peripheral edge, with the peripheral edge including a continuous elastomeric rim; and b.) a pivotal cover member hingedly secured to said housing base for movement from an open position to a closed position, said cover member including an extendable spout and a handle, where the snout is extended or retracted for different opeating modes, said cover member further comprising:

i.) a first circular member having a central aperture and a peripheral aperture, where said first circular member is positioned to lie in fluid sealing engagement with said continuous elastomeric rim in said closed position, and said peripheral aperture slidably receives said spout;

ii.) a collapsible bellows member positioned to lie adjacent said first circular member and containing a through opening aligned with said central aperture;

iii.) a circular bellows depressing plate overlying said bellows member;

iv.) an encircling compression spring about said bellows member to facilitate expanding said bellows member after manual compression; and where said handle includes a hand activating member to exert an essentially normal pressure on said bellows depressing plate.

2. The portable receptacle according to claim 1, wherein said circular bellows depressing plate is activated by a sliding member operable by said hand activating member.

3. The portable receptacle according to claim 1, wherein said peripheral edge includes opposing reduced portions to allow for folding and collapsing said foil bag upon itself.

4. The portable receptacle according to claim 1, wherein said handle is U-configured having a gripping portion and a pair of legs, and said hand activating member is partially recessed within said gripping portion.

5. The portable receptacle according to claim 1, wherein said pivotal cover member is concave having a peripheral rim, and said first circular member has an upper surface and a lower surface, where said upper surface is fixedly secured to said peripheral rim of said cover member and said lower surface is in fluid sealing engagement with said continuous elastomeric rim in said closed position.

6. The portable receptacle according to claim 1, wherein said first circular member includes a lower surface mounting a pivotal, floating valve mechanism operable to effect a shut off of said central aperture.

7. The portable receptacle according to claim 4, wherein said hand activating member includes a supplemental spring mounted within said gripping portion to facilitate movrmrnt of said hand activating member into said gripping portion.

8. The portable receptacle according to claim 1, including means to temporarily secure said pivotal cover member to said circular housing base.

* * * * *